April 15, 1941.     C. ZISCHKAU     2,238,437
PROCESS FOR RECOVERING INDIUM
Filed March 9, 1940
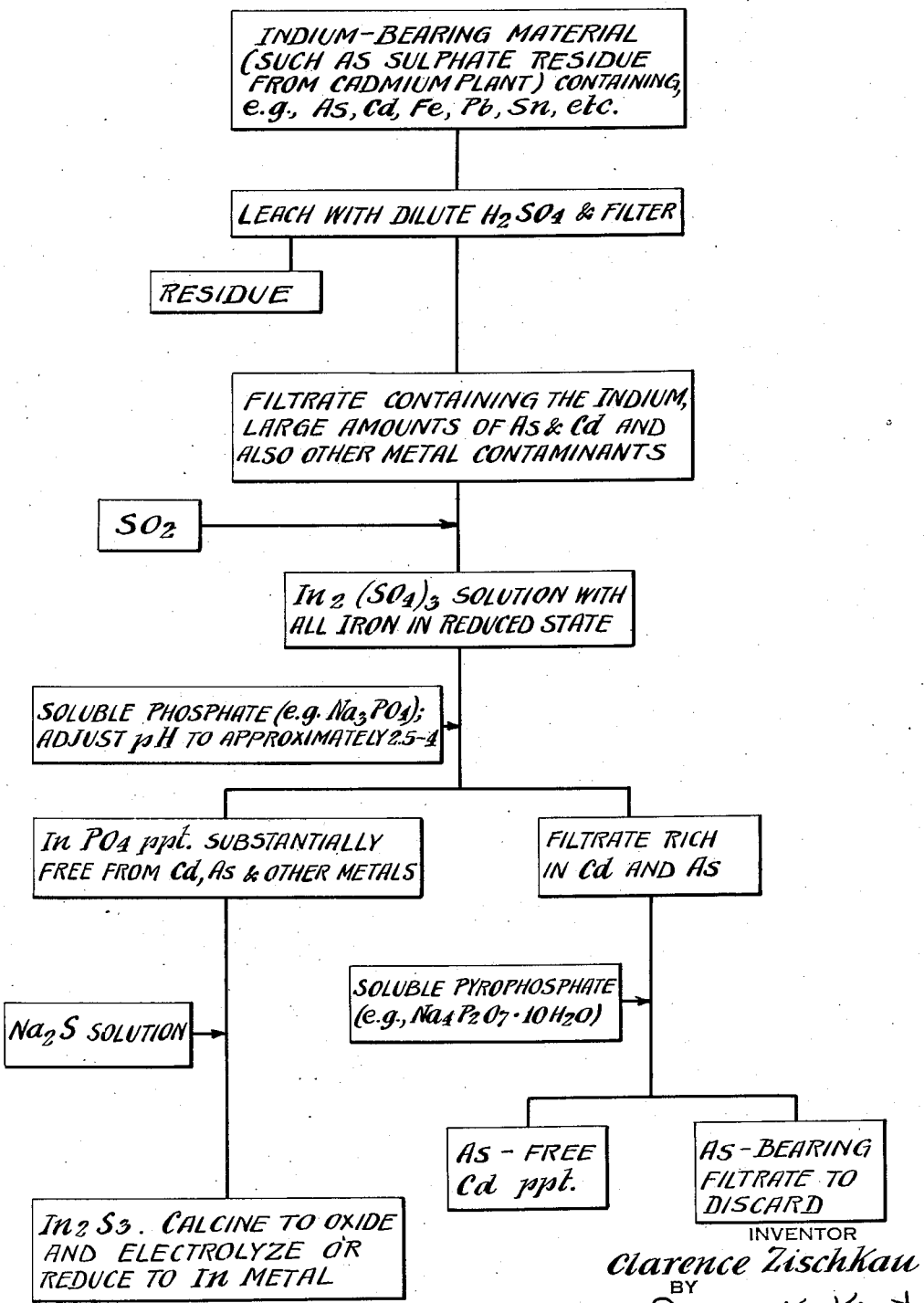

Patented Apr. 15, 1941

2,238,437

UNITED STATES PATENT OFFICE 2,238,437

PROCESS FOR RECOVERING INDIUM

Clarence Zischkau, Woodbridge, N. J., assignor to American Smelting and Refining Company, New York, N. Y., a corporation of New Jersey Application March 9, 1940, Serial No. 323,092

9 Claims. (Cl. 75—121)

This invention relates to the art of recovering indium.

Like cadmium, indium commonly occurs as a minor constituent of certain zinciferous ores and, upon roasting such ores, the indium passes into the fume together with cadmium, lead, arsenic and other components. In the usual practice of treating the fume for the recovery of the bulk of its cadmium content, there remains a so-called lead sulphate residue comprising the indium and such ingredients as arsenic, cadmium, lead and iron.

While the bulk of the indium will be found in the aforesaid sulphate residues, nevertheless the actual quantity of indium in such a residue is small so that one is confronted with the problem of separating a small quantity of indium from large quantities of other residue components. Thus, while the indium may be readily extracted from the residue by leaching with either dilute sulphuric acid or water saturated with sulphur dioxide, large quantities of other constituents of the residue, such as cadmium and arsenic, are also dissolved by the leach so that one still faces the problem of separating the small amount of indium from the other components of the leach solution. Further, if one seeks to precipitate the indium by simple neutralization of the leach solution, it will be found that large quantities of cadmium and arsenic will also precipitate.

The present invention provides for the extraction and recovery of indium from various indium-bearing materials by a new process which effects a clean and substantially complete recovery of indium without reintroduction or recirculation of impurities into the process thereby minimizing the amounts of material to be handled with accompanying savings in operating cost. The new process also provides a procedure for readily recovering cadmium initially extracted with the indium.

A feature of the invention is the selective precipitation of indium from acid solution as indium phosphate, it having been found that at the proper hydrogen ion concentration soluble orthophosphates will precipitate indium to the substantial exclusion of such elements in the solution as cadmium and arsenic.

The invention further consists in the new and novel features of operation and the new and original arrangements and combinations of steps in the process hereinafter described and more particularly set forth in the claims.

The drawing accompanying this specification and forming a part thereof is a flow sheet of the new process.

In carrying the invention into practice, the initial step will ordinarily be that of extracting the indium from the indium-bearing material by leaching with dilute acid. The indium-bearing material may vary, of course, in origin but for purposes of illustration it may be assumed to comprise the lead sulphate residue from a typical cadmium plant as indicated in the flow sheet, in which event the leach solution will normally contain, not only the indium, but also arsenic, cadmium, iron, tin and other constituents of the starting material as well.

The presence of iron in the leach solution may or may not interfere with the subsequent selective precipitation of the indium depending upon whether such iron is present in the ferric or ferrous state. Accordingly, as a precautionary measure the leach solution should be treated with a reducing agent in order to insure that iron, if present, is in the reduced condition. This can be readily accomplished by the addition of sulphur dioxide to the leach solution either simultaneously with, or subsequent to, the leaching.

Following the reducing treatment, the indium is selectively precipitated from the leach solution to the substantial exclusion of such elements as arsenic, cadmium and iron by adding a soluble orthophosphate to the leach solution and adjusting, if necessary, the hydrogen ion concentration of the latter to a proper value. By "a soluble orthophosphate" is meant a member of the group consisting of orthophosphoric acid ($H_3PO_4$) and its soluble salts (mono-, di-, or tri-). As to hydrogen iron concentration, it has been found that a pH value within the approximate range of 2.5 to 4.0 should be observed.

To recover the indium as metal, it is advantageous to convert the indium phosphate to oxide. This is readily accomplished by treating the precipitate with sodium sulphide solution thereby converting the indium phosphate to indium sulphide which in turn is readily calcined to indium oxide. The sulphide treatment also tends to dissolve out any tin which may have come down with the indium phosphate. Indium metal may be recovered from the indium oxide either by reduction or electrolysis as indicated in the flow sheet.

Another manner of converting the indium phosphate to the oxide is to treat the former with caustic alkali or the like to produce indium hydroxide and then roast the latter, all as more fully described and claimed in applicant's copending application, Serial No. 345,056, filed July 12, 1940, for "Recovering indium."

Inasmuch as the precipitation of the indium as indium phosphate is a selective precipitation, it follows that the filtrate will be rich in such elements as arsenic, cadmium and iron. Accordingly, this filtrate is treated with a soluble pyrophosphate with the result that cadmium is selectively precipitated leaving the arsenic as a discard filtrate. This selective precipitation of cadmium is readily effected at a pH value for the solution corresponding to that previously mentioned with respect to the indium precipitation. The arsenic-free cadmium pyrophosphate is then sent to the cadmium plant for recovery of the cadmium.

The selective nature of the indium precipitation by the process of the invention is well illustrated by the following example in which a leach solution from a lead sulphate residue of the type previously referred to was treated.

This leach solution, which contained 32 parts by weight of indium and 59 and 70 parts by weight of arsenic and cadmium, respectively, was first treated with sufficient sulphur dioxide to reduce all iron present to the ferrous state. There was then added sufficient sodium phosphate to provide a slight excess of phosphate at the desired pH value of the solution.

Following the addition of the phosphate, sufficient sodium carbonate was added to the solution to bring the pH of the latter to 3.1 at room temperature, and the solution stirred for one-half hour with a mechanical stirrer. The indium phosphate precipitate was filtered off and purified by redissolving it in acid and reprecipitating as above with the addition of a small amount of sodium phosphate.

The final precipitate amounted to 77.5 parts by weight and accounted for 99.5% of the indium content of the original leach solution. Analysis of the precipitate showed 41.6% indium, 34.5% $PO_4$, 0.2% tin, approximately 0.1% tellurium, approximately 0.01% lead, traces only of arsenic, cadmium, copper, nickel and silver, and no zinc.

What is claimed is:

1. The process for treating an acid solution containing indium, cadmium and arsenic which comprises precipitating the indium as orthophosphate while retaining the cadmium and arsenic in solution, recovering indium from the orthophosphate precipitate, precipitating cadmium from the indium-depleted solution as pyrophosphate while retaining the arsenic in solution, and recovering cadmium from the pyrophosphate precipitate.

2. The process for treating an acid solution containing indium, cadmium and arsenic which comprises precipitating the indium as orthophosphate while retaining the cadmium and arsenic in solution, thereafter precipitating cadmium by addition of pyrophosphate while retaining the arsenic in solution, and recovering cadmium from the pyrophosphate precipitate.

3. The process for treating the sulphate residues from cadmium plant operations which comprises acid leaching such residues, reducing any ferric iron in the leach solution to the ferrous state, incorporating a soluble orthophosphate in the leach solution at a pH value favorable to precipitation of indium but unfavorable to precipitation of cadmium, filtering, incorporating a soluble pyrophosphate in the filtrate at a pH value favoring precipitation of cadmium, and recovering cadmium from the latter precipitate.

4. The process of treating the sulphate residues from cadmium plant operations which comprises acid leaching such residues, reducing any ferric iron in the leach solution to the ferrous state, incorporating a soluble orthophosphate in the leach solution at a pH value favorable to precipitation of indium but unfavorable to precipitation of cadmium, treating the indium precipitate with a soluble sulphide, calcining the resulting sulphide, and recovering indium metal from the calcine.

5. The process for treating the sulphate residues from cadmium plant operations which comprises acid leaching such residues, reducing any ferric iron in the leach solution to the ferrous state, incorporating a soluble orthophosphate in the leach solution at a pH value favorable to precipitation of indium but unfavorable to precipitation of cadmium while maintaining the iron in ferrous condition, separating the precipitated indium phosphate from the solution remaining from the precipitation, converting the indium phosphate to indium oxide, and reducing the indium oxide to metallic indium.

6. The process for treating indium-bearing material which comprises leaching same with an acid solution to extract the indium, and selectively precipitating indium from the leach solution as indium orthophosphate.

7. The process for treating indium-bearing material containing iron which comprises leaching the material with an acid solution, reducing iron in the leach solution to the ferrous state, and precipitating indium by the addition of soluble orthophosphate to said leach solution.

8. In a process for recovering indium from an acid solution comprising indium, cadmium and arsenic, that improvement which consists in introducing a soluble orthophosphate into the solution while maintaining the latter at a pH value of from 2.5 to 4.

9. In the recovery of indium from indium-bearing materials, the steps which consist in producing an indium-containing solution from the said materials, precipitating the indium from the said solution as indium orthophosphate, converting the indium orthophosphate into indium oxide and reducing the indium oxide to metallic indium.

CLARENCE ZISCHKAU.